US008346955B2

(12) United States Patent
Lee et al.

(10) Patent No.: US 8,346,955 B2
(45) Date of Patent: Jan. 1, 2013

(54) STREAMING CONTENT DELIVERY MANAGEMENT FOR A WIRELESS COMMUNICATION DEVICE

(75) Inventors: Woo Jae Lee, Manhattan, KS (US); Lyle T. Bertz, Lee's Summit, MO (US); Cesar Perez, Olathe, KS (US); Jeffrey J. Klaumann, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 514 days.

(21) Appl. No.: 12/611,615

(22) Filed: Nov. 3, 2009

(65) Prior Publication Data

US 2011/0106963 A1    May 5, 2011

(51) Int. Cl.
*G06F 15/16* (2006.01)
(52) U.S. Cl. ......................................... 709/231
(58) Field of Classification Search .................. 709/217, 709/231, 233
See application file for complete search history.

(56) References Cited

U.S. PATENT DOCUMENTS

| | | | |
|---|---|---|---|
| 5,757,360 | A | 5/1998 | Nitta et al. |
| 6,363,204 | B1 | 3/2002 | Johnson et al. |
| 6,570,606 | B1 | 5/2003 | Sidhu et al. |
| 7,143,648 | B2 | 12/2006 | Pristup |
| 7,188,122 | B2 * | 3/2007 | Smith et al. ............................. 1/1 |
| 7,376,388 | B2 * | 5/2008 | Ortiz et al. ...................... 455/3.06 |
| 7,630,721 | B2 * | 12/2009 | Ortiz ........................... 455/456.1 |
| 7,796,162 | B2 * | 9/2010 | Ortiz ............................ 348/211.8 |
| 7,904,579 | B2 * | 3/2011 | Janik et al. ...................... 709/231 |
| 8,042,140 | B2 * | 10/2011 | Thomas et al. .................. 725/94 |
| 8,051,453 | B2 * | 11/2011 | Arseneau et al. ................ 725/94 |
| 8,078,751 | B2 * | 12/2011 | Janik et al. ...................... 709/231 |
| 2003/0117440 | A1 | 6/2003 | Hellyar et al. |
| 2005/0036509 | A1 * | 2/2005 | Acharya et al. ................ 370/466 |
| 2006/0282855 | A1 * | 12/2006 | Margulis ........................... 725/43 |
| 2007/0143493 | A1 | 6/2007 | Mullig et al. |
| 2007/0180401 | A1 | 8/2007 | Singh et al. |
| 2007/0204228 | A1 * | 8/2007 | Minear .......................... 715/728 |
| 2008/0228429 | A1 | 9/2008 | Huang et al. |

FOREIGN PATENT DOCUMENTS

EP      1562350      8/2005

OTHER PUBLICATIONS

"Method for Reducing Bandwidth of Streaming Audio and Video Applications;" IP.com Journal; Mar. 23, 2005; p. 1; IP.com Inc.; West Henrietta, NY, U.S.A.
H. Schulzrinne, et al.; "Real Time Streaming Protocol 2.0 (RTSP);" MMUSIC Working Group; Jul. 13, 2009; pp. 1-282; Obsoletes: RFC 2326; IETF Trust.

* cited by examiner

*Primary Examiner* — Ario Etienne
*Assistant Examiner* — Sargon Nano (57) ABSTRACT

A wireless communication device comprises a wireless communication interface, a user interface, and a processing system. The wireless communication interface is configured to receive streaming content from a communication system. The user interface is configured to display the streaming content in a plurality of windows. The processing system is configured to monitor a screen arrangement of the wireless communication device and determine an amount that each of the windows is covered, and if the amount exceeds a threshold value, to initiate a packet indicating a source packet address of the streaming content being displayed in the covered window. The wireless communication interface is further configured to transfer the packet to the communication system, wherein the communication system receives the packet, and in response, ceases transmission of the streaming content being displayed in the covered window to the wireless communication device.

16 Claims, 7 Drawing Sheets

STREAMING CONTENT DELIVERY MANAGEMENT FOR A WIRELESS COMMUNICATION DEVICE

TECHNICAL BACKGROUND

Many individuals are increasingly utilizing wireless communication devices to stream media content from sources over a communication network. For example, a user of a wireless communication device may request audio, video, text, and other data from a content provider, and the content provider will stream the requested media to the wireless communication device. When the user of the communication device requests content from the content provider, typically the requested media is transferred from the content provider to the communication device for the use or enjoyment of the user.

However, as more users increasingly employ wireless devices to stream content over wireless links, the heavy bandwidth consumption required to transfer such content becomes a key constraint to the quality of service provided to the users. For example, streaming video content consumes more bandwidth for an extended amount of time compared to a simple web page consisting of images and text. Past solutions to address this problem include controlling the bandwidth consumed by a device based on its real-time data bandwidth. For example, if a device is dropping several streaming video packets, the bit rate of the content being streamed is reduced until the device stops requesting retransmission of dropped packets. Unfortunately, this bandwidth reduction may cause a degradation in the quality of the video feed, and does not consider how the data is being used by the device, which may result in limiting more bandwidth than necessary.

OVERVIEW

A wireless communication device comprises a wireless communication interface, a user interface, and a processing system. The wireless communication interface is configured to receive streaming content from a communication system. The user interface is configured to display the streaming content in a plurality of windows. The processing system is configured to monitor a screen arrangement of the wireless communication device and determine an amount that each of the windows is covered, and if the amount exceeds a threshold value, to initiate a packet indicating a source packet address of the streaming content being displayed in the covered window. The wireless communication interface is further configured to transfer the packet to the communication system, wherein the communication system receives the packet, and in response, ceases transmission of the streaming content being displayed in the covered window to the wireless communication device.

A method of operating a wireless communication device comprises receiving streaming content from a communication system, displaying the streaming content in a plurality of windows, monitoring a screen arrangement of the wireless communication device and determining an amount that each of the windows is covered, and if the amount exceeds a threshold value, initiating a packet indicating a source packet address of the streaming content being displayed in the covered window, and transferring the packet to the communication system, wherein the communication system receives the packet, and in response, ceases transmission of the streaming content being displayed in the covered window to the wireless communication device.

A wireless communication device comprises a wireless communication interface, a user interface, and a processing system. The wireless communication interface is configured to receive streaming content from a communication system. The user interface is configured to display the streaming content in a plurality of windows. The processing system is configured to monitor a screen arrangement of the wireless communication device and determine an amount that each of the windows is covered, and if the amount exceeds a threshold value, to initiate a packet indicating a source packet address and a source port of the streaming content being displayed in the covered window. The wireless communication interface is further configured to transfer the packet to the communication system, wherein the communication system receives the packet, and in response, ceases transmission of the streaming content being displayed in the covered window to the wireless communication device based on the source packet address and the source port of the streaming content being displayed in the covered window.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
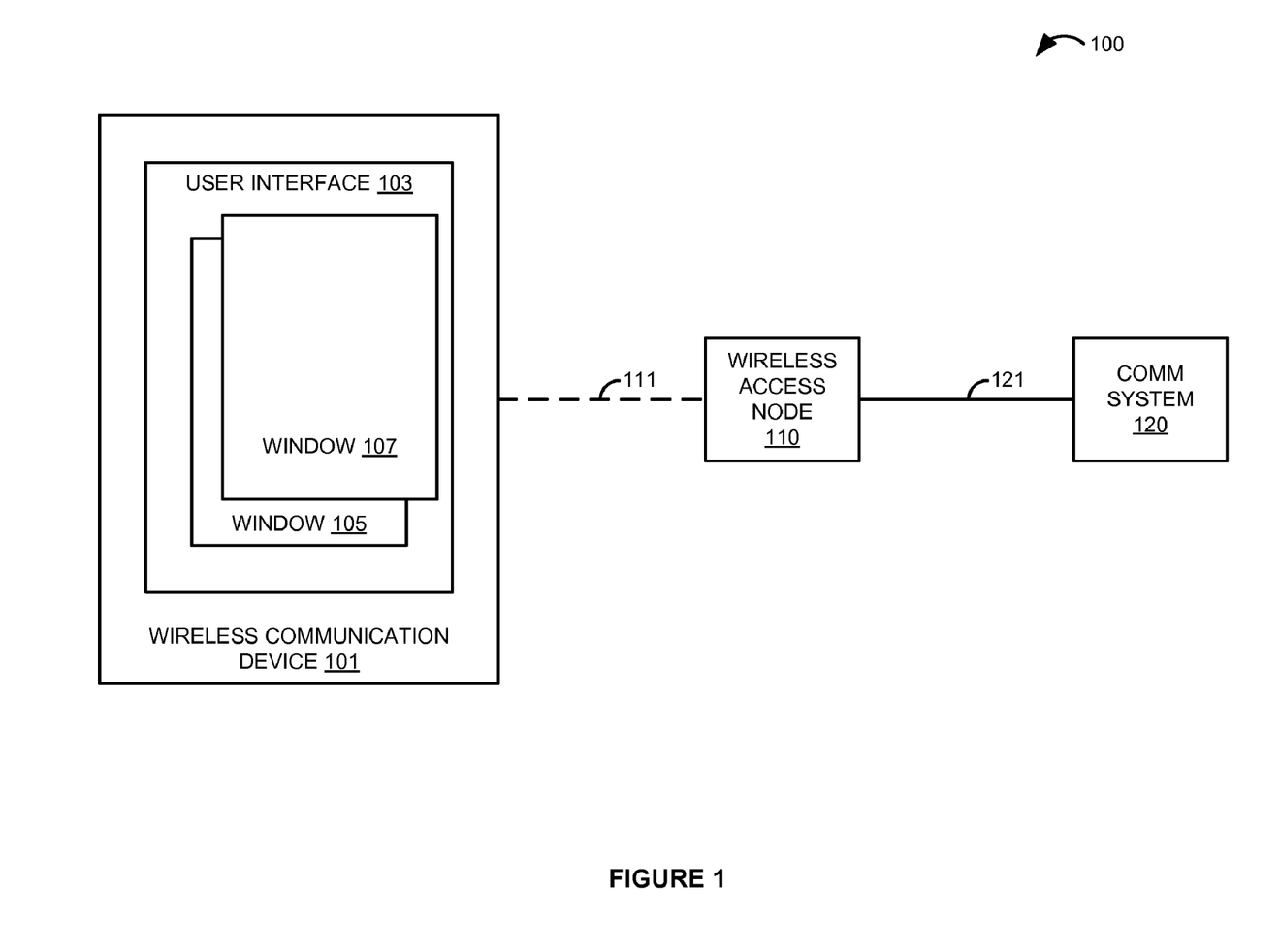
FIG. 1 is a block diagram that illustrates a communication environment.

FIG. 1 is a block diagram that illustrates communication environment 100. Communication environment 100 includes wireless communication device 101, wireless access node 110, and communication system 120. Wireless communication device 101 includes user interface 103 which displays window 105 and window 107. Wireless communication device 101 communicates with wireless access node 110 over wireless communication link 111. Wireless access node 110 is in communication with communication system 120 over communication link 121.

Figure 2:
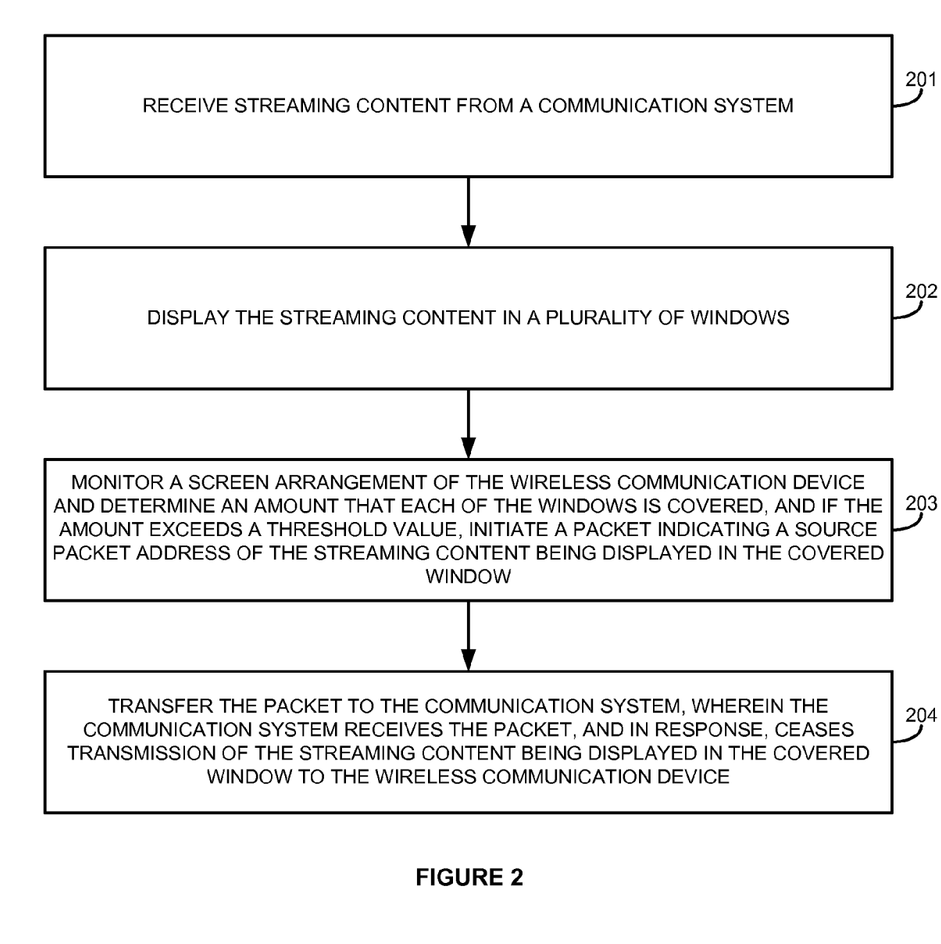
FIG. 2 is a flow diagram that illustrates an operation of the communication environment.

FIG. 2 is a flow diagram that illustrates an operation of communication environment 100. The steps of the operation are indicated below parenthetically. In FIG. 2, wireless communication device 101 receives streaming content from communication system 120 (201). The streaming content may comprise multiple media streams, such as video and/or audio streams, and may be received from multiple sources/content providers, or from the same content provider. Communication system 120 transfers the streaming content to wireless communication device 101 via wireless access node 110 and communication links 111 and 121.

Wireless communication device 101 displays the streaming content in a plurality of windows 105 and 107 (202). Wireless communication device 101 displays the windows 105 and 107 on user interface 103. Windows 105 and 107 may both be fully visible, or may overlap partially or fully. A user of wireless communication device 101 may position the windows 105 and 107 in any desired arrangement on user interface 103.

Wireless communication device 101 monitors the screen arrangement of wireless communication device 101 and determines an amount that each of the windows 105 and 107 is covered (203). The amount that each of the windows 105 and 107 is covered could comprise, for example, the amount that each of the windows is not visible to a user of wireless communication device 101. In another example, the amount that each of the windows 105 and 107 is covered could refer to any system of measuring an amount that each window is obstructed or obscured by other elements on user interface 103. The amount could range anywhere from 0% (when the window is maximized, in focus, or on top of all other windows), to 100% (when the window is minimized or completely covered by other windows or screen elements). For example, in FIG. 1, window 107 is overlapping the majority of window 105. Thus, window 107 is 0% covered, and window 105 is about 75% covered by window 107. Note that percentages are discussed solely to illustrate the ideas presented herein by way of example; the term amount as used herein may refer to any system of measurement.

If the amount that each of the windows 105 and 107 is covered exceeds a threshold value, wireless communication device 101 initiates a packet indicating a source packet address of the streaming content being displayed in the covered window (203). The threshold value may be predetermined, or may be selected by a user of wireless communication device 101. In some examples, the threshold could be set dynamically, and different threshold values could be set for different windows. For example, the threshold for window 107 may be set to 80%, and the threshold for window 105 may be set to 50%. In this case, since window 105 is 75% covered, which exceeds the 50% threshold value for window 105, wireless communication device 101 initiates a packet indicating a source packet address of the streaming content being displayed in the covered window 105.

In some examples, the amount that each of the windows 105 and 107 is covered exceeds the threshold value if the window is minimized. In other examples, the amount that each of the windows 105 and 107 is covered exceeds the threshold value if a display screen of wireless communication device 101 is turned off. In still other examples, wireless communication device 101 could assign a priority to each of the windows 105 and 107, and the threshold value for each of the windows may be determined based on the priority assigned to each of the windows. The priority for each of the windows could be predetermined or may be determined dynamically. For example, the priority could be based on the number of times a window 105 or 107 has been brought to the forefront, the duration of time a window 105 or 107 has been visible in the forefront, or as supplied by a user of wireless communication device 101.

Referring again to FIG. 2, wireless communication device 101 transfers the packet to communication system 120 (204). As discussed above, the packet indicates a source packet address of the streaming content being displayed in the covered window 105, such as the packet address of a content provider transferring the streaming content. In response to receiving the packet, communication system 120 ceases transmission of the streaming content being displayed in the covered window 105 to wireless communication device 101 (204). In one example, communication system 120 ceases transmission of the streaming content being displayed in the covered window 105 to wireless communication device 101 based on the source packet address. In other examples, the packet sent by wireless communication device 101 to communication system 120 comprises a source port of the streaming content being displayed in window 105. In this case, communication system 120 ceases transmission of the streaming content being displayed in window 105 to wireless communication device 101 based on the source packet address and the source port of the streaming content being displayed in window 105.

Advantageously, by comparing the amount each window is covered to its threshold value, wireless communication device 101 can dynamically determine the streaming content that may be suspended without impacting a user's experience. With knowledge of which streams are not currently viewed by the user, device 101 can instruct communication system 120 to cease transmission of these streams to wireless communication device 101, thereby preserving bandwidth on the backhaul link 121 between communication system 120 and wireless access node 110, and the wireless link 111 between wireless access node 110 and wireless communication device 101. Note that typically communication system 120 would continue to receive all of the streaming content initially requested by communication device 101, enabling communication system 120 to immediately recommence transmitting the halted stream upon receipt of instructions from wireless communication device 101 to do so. However, in some examples, communication system 120 could also cease receiving the suspended stream from the content provider.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus— including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Wireless network protocols that may be utilized by wireless access node 110 include CDMA, GSM, UMTS, HSPA, EV-DO, EV-DO rev. A, 3GPP LTE, WiMAX, Wi-Fi, Internet, telephony, or some other communication format—including combinations thereof.

Communication system 120 comprises a computer system and communication interface. Communication system 120 may also include other components such as a router, server, data storage system, and power supply. Communication system 120 may reside in a single device or may be distributed across multiple devices. Communication system 120 may be a discrete system or may be integrated within other systems— including other systems within communication environment 100. Communication system 120 could comprise a packet gateway, mobile switching center, network gateway system, Internet access node, application server, service node, firewall, or some other communication system including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport media—including combinations thereof. Communication link 121 could use various communication protocols, such as time-division multiplexing (TDM), Internet Protocol (IP), Ethernet, telephony, optical networking, hybrid fiber coax (HFC), communication signaling, wireless protocols, or some other communication format—including combinations thereof. Communication link 121 could be a direct link or may include intermediate networks, systems, or devices.

Figure 3:
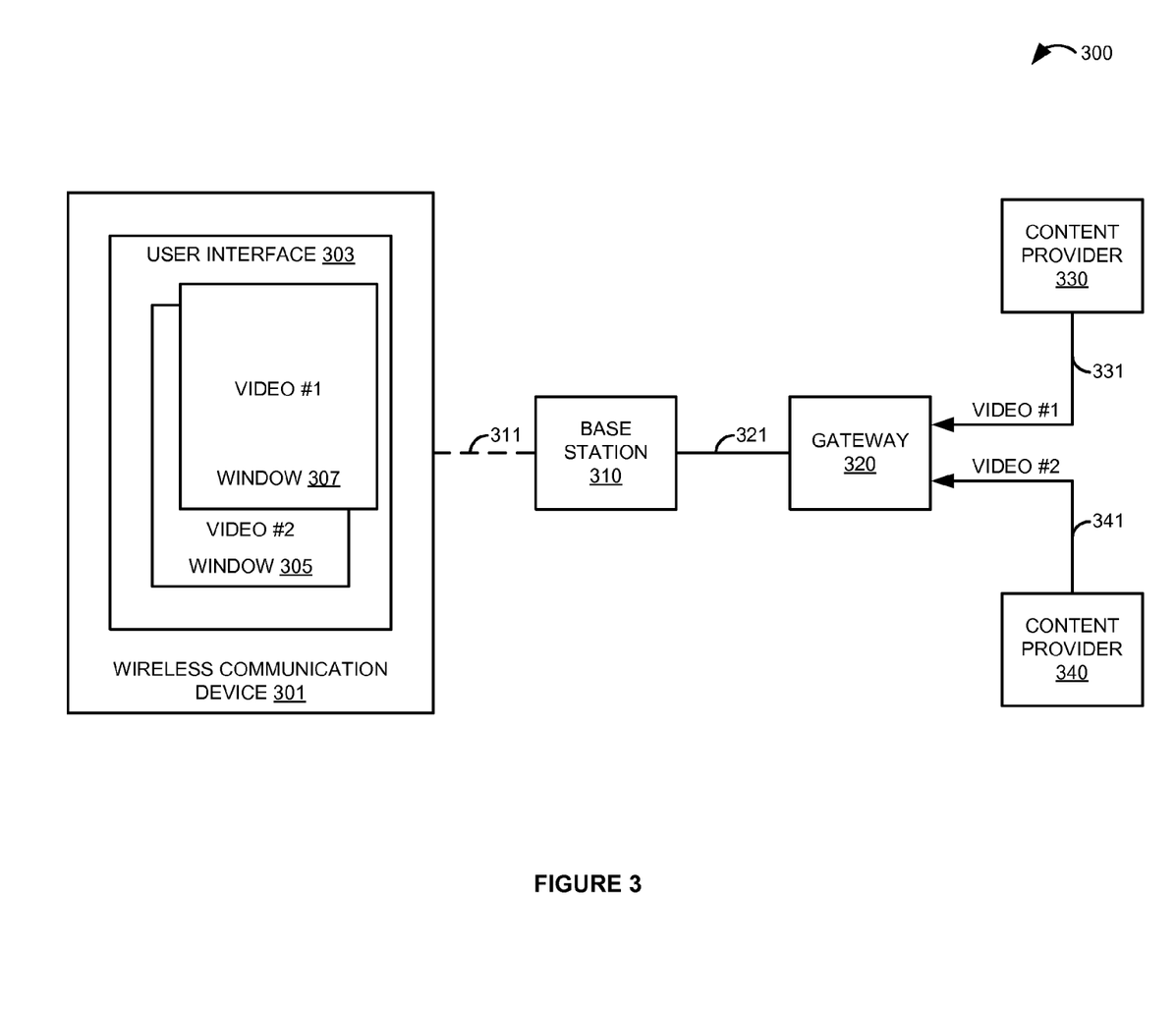
FIG. 3 is a block diagram that illustrates a communication environment in an exemplary embodiment.

FIG. 3 is a block diagram that illustrates communication environment 300 in an exemplary embodiment. Communication environment 300 includes wireless communication device 301, base station 310, gateway 320, content provider 330, and content provider 340. Wireless communication device 301 includes user interface 303 which displays window 305 and window 307. Wireless communication device 301 communicates with base station 310 over wireless communication link 311. Base station 310 is in communication with gateway 320 over link 321. Gateway 320 is in communication with content provider 330 over communication link 331 and also in communication with content provider 340 over link 341.

Figure 4:
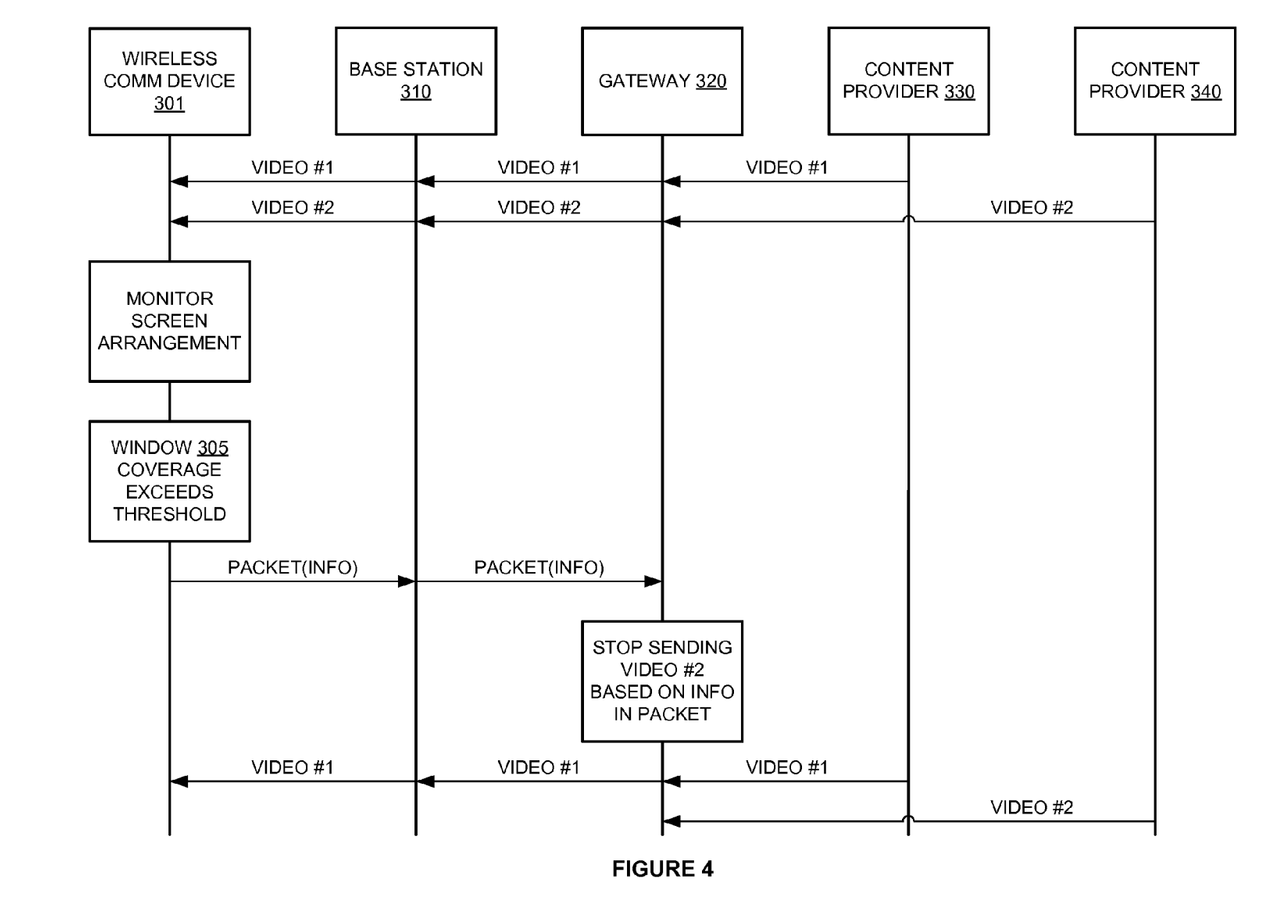
FIG. 4 is a sequence diagram that illustrates an operation of the communication environment.

FIG. 4 is a sequence diagram that illustrates an operation of communication system 300. In FIG. 4, wireless communication device 301 is engaged in session communications with content provider 330 and content provider 340. Via gateway 320, content provider 330 is transferring streaming video #1 to wireless communication device 301, and content provider 340 is transferring streaming video #2 to device 301. As shown in FIG. 3, wireless communication device 301 displays streaming video #1 in window 307 and streaming video #2 in window 305.

Wireless communication device 301 monitors the screen arrangement and determines the amount each window 305 and 307 is covered. As shown in FIG. 3, window 305 is about 60% covered by window 307, and window 307 is completely uncovered. The example of FIG. 4 assumes the threshold value is set to 50% for both windows. By comparing the window coverage amounts to the threshold value, wireless communication device 301 determines that the 60% coverage of window 305 exceeds the 50% threshold value.

In response to determining that the coverage of window 305 exceeds the threshold value, wireless communication device 301 transfers a packet to gateway 320. The packet comprises instructions to direct gateway 320 to stop sending video stream #2. The packet also comprises the source packet address of the video #2 feed, which in this case is the packet address that content provider 340 is utilizing to transfer video #2 to gateway 320.

Based on the information in the packet, gateway 320 stops transferring video #2 to wireless communication device 301. As shown in FIG. 4, gateway 320 continues to transfer video #1 from content provider 330 to wireless communication device 301, and continues to receive video #2 from content provider 340. In addition, by buffering the inactive stream, gateway 320 is prepared to rapidly resume transmission of video #2 if the coverage of window 305 decreases below the threshold and wireless communication device 301 again requests video #2.

Figure 5:
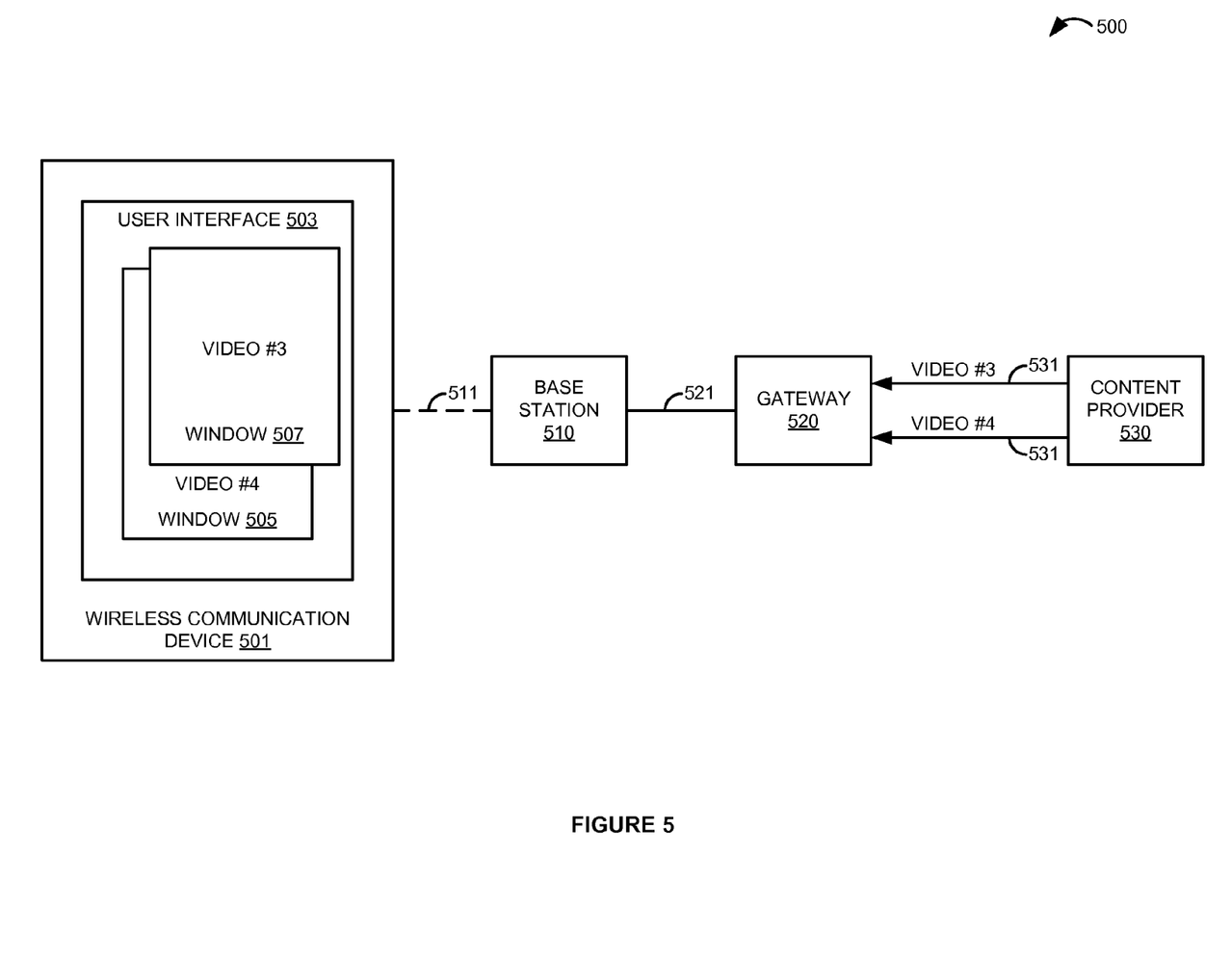
FIG. 5 is a block diagram that illustrates a communication environment in an exemplary embodiment.
Figure 6:
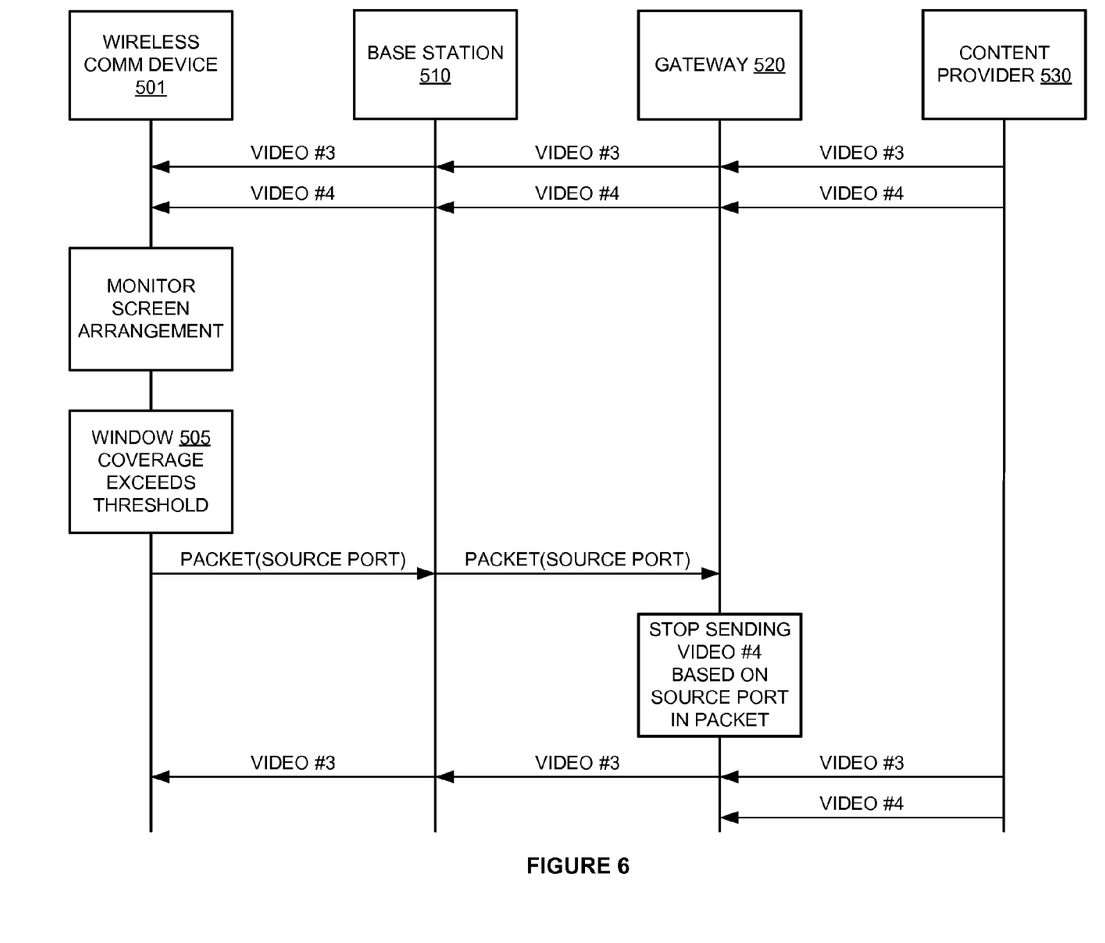
FIG. 6 is a sequence diagram that illustrates an operation of the communication environment.

While blocking packets based on a source packet address of the content is effective when the content provider is utilizing the source packet address exclusively for transmission of the blocked video stream, a problem arises when a content provider is using the same packet address to transfer multiple media streams to a wireless communication device, or is transferring other data in addition to the stream to be blocked. FIGS. 5 and 6 and the following associated description address this issue.

FIG. 5 is a block diagram that illustrates communication environment 500 in an exemplary embodiment. Communication environment 500 includes wireless communication device 501, base station 510, gateway 520, and content provider 530. Wireless communication device 501 includes user interface 503 which displays window 505 and window 507. Wireless communication device 501 communicates with base station 510 over wireless communication link 511. Base station 510 is in communication with gateway 520 over link 521. Gateway 520 is in communication with content provider 530 over communication link 531.

FIG. 6 is a sequence diagram that illustrates an operation of communication environment 500. In FIG. 6, wireless communication device 501 is receiving multiple streams of video from content provider 530. Content provider 530 is transferring streaming video #3 and #4 to wireless communication device 501 from the same source packet address. As shown in FIG. 5, wireless communication device 501 displays streaming video #3 in window 507 and streaming video #4 in window 505.

Wireless communication device 501 monitors the screen arrangement and determines the amount each window 505 and 507 is covered, and determines that the coverage of window 505 exceeds the threshold value. In response, wireless communication device 501 transfers a packet to gateway 520. In this example, the packet comprises the source port of the video #4 feed, which in this case is the port that content provider 540 is utilizing to transfer video #4 to gateway 520.

Based on the source packet address and the source port of the streaming content being displayed in the window, gateway 520 stops transferring video #4 to wireless communication device 501. As shown in FIG. 6, gateway 520 continues to transfer video #3 to wireless communication device 501, and continues to receive video #4 from content provider 530. Advantageously, when a content provider uses the same packet address to transfer multiple video streams to a wireless communication device, the wireless communication device can request suspension of a specific video stream by also providing the port number of the source of that video.

Figure 7:
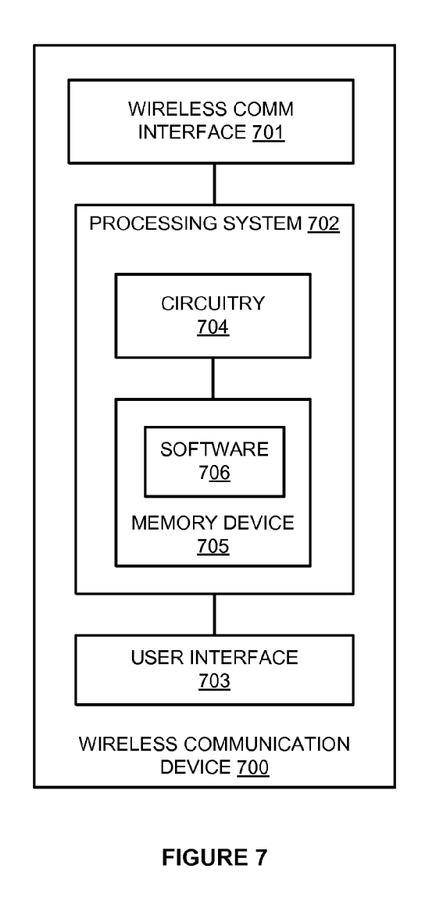
FIG. 7 is a block diagram that illustrates a wireless communication device.

FIG. 7 is a block diagram that illustrates wireless communication device 700. Wireless communication device 700 provides an example of wireless communication device 101, although device 101 could use alternative configurations. Wireless communication device 700 comprises wireless communication interface 701, processing system 702, and user interface 703. Processing system 702 is linked to wireless communication interface 701 and user interface 703. Processing system 702 includes processing circuitry 704 and memory device 705 that stores operating software 706. Wireless communication device 700 may include other well-known components such as a battery and enclosure that are not shown for clarity. Wireless communication device 700 may comprise a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, GSM, UMTS, HSPA, EV-DO, EV-DO rev. A, 3GPP LTE, WiMAX, Wi-Fi, or some other wireless communication format. Wireless communication interface 701 is configured to receive streaming content from a communication system and transfer a packet to the communication system.

User interface 703 comprises components that interact with a user to receive user inputs and to present media and/or information. User interface 703 may include a speaker, microphone, buttons, lights, display screen, touch screen, touch pad, scroll wheel, communication port, or some other user input/output apparatus—including combinations thereof. User interface 703 is configured to display streaming content in a plurality of windows.

Processing circuitry 704 comprises microprocessor and other circuitry that retrieves and executes operating software 706 from memory device 705. Memory device 705 comprises a disk drive, flash drive, data storage circuitry, or some other memory apparatus. Processing circuitry 704 is typically mounted on a circuit board that may also hold memory device 705 and portions of communication interface 701 and user interface 703. Operating software 706 comprises computer programs, firmware, or some other form of machine-readable processing instructions. Operating software 706 may include an operating system, utilities, drivers, network interfaces, applications, or some other type of software. When executed by processing circuitry 704, operating software 706 directs processing system 702 to operate wireless communication device 700 as described herein. In particular, operating software 706 directs processing system 702 to monitor a screen arrangement of wireless communication device 700 and determine an amount that each of the windows is covered. If the amount exceeds a threshold value, operating software 706 directs processing system 702 to initiate a packet indicating a source packet address of the streaming content being displayed in the covered window.

Figure 8:
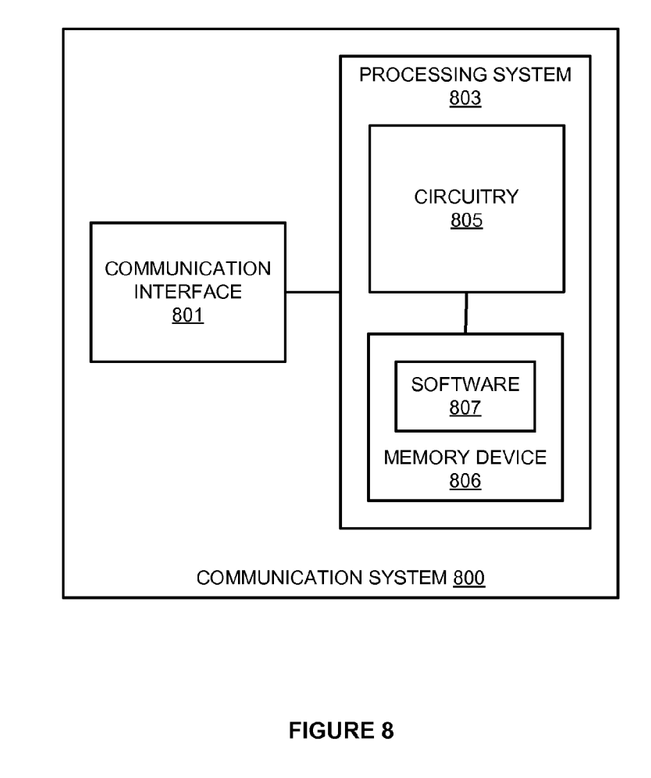
FIG. 8 is a block diagram that illustrates a communication system.

FIG. 8 is a block diagram that illustrates communication system 800. Communication system 800 provides an example of communication system 120, although system 120 may use alternative configurations. Communication system 800 comprises communication interface 801 and processing system 803. Processing system 803 is linked to communication interface 801. Processing system 803 includes processing circuitry 805 and memory device 806 that stores operating software 807.

Communication interface 801 comprises components that communicate over communication links, such as network cards, ports, RF transceivers, processing circuitry and software, or some other communication components. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 is capable of transferring streaming content to a wireless communication device and receiving packets from the wireless communication device.

Processing circuitry 805 comprises microprocessor and other circuitry that retrieves and executes operating software 807 from memory device 806. Memory device 806 comprises a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate communication system 800 as described herein. In particular, operating software 807 directs processing system 803 to cease transmission of streaming content being displayed in a covered window to a wireless communication device in response to receiving a packet from the wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
a wireless communication interface configured to receive streaming content from a communication system;

a user interface configured to display the streaming content in a plurality of windows;

a processing system configured to monitor a screen arrangement of the wireless communication device and determine an amount that each of the windows is covered from view to a user, and if the amount exceeds a threshold value, to initiate a packet indicating at least a source packet address and a source port of the streaming content being displayed in the covered window; and the wireless communication interface further configured to transfer the packet to the communication system, wherein the communication system receives the packet, and in response, ceases transmission of the streaming content being displayed in the covered window to the wireless communication device based on at least the source packet address and the source port of the streaming content being displayed in the covered window.

2. The wireless communication device of claim 1 wherein the source packet address comprises an Internet Protocol address of a content provider of the streaming content being displayed in the covered window.

3. The wireless communication device of claim 1 wherein the threshold value is fifty percent.

4. The wireless communication device of claim 1 wherein the amount that each of the windows is covered is the amount that each of the windows is not visible to a user of the wireless communication device.

5. The wireless communication device of claim 1 wherein the wireless communication device assigns a priority to each of the windows, and the threshold value for each of the windows is based on the priority assigned to each of the windows.

6. The wireless communication device of claim 1 wherein the threshold value is set by a user of the wireless communication device.

7. The wireless communication device of claim 1 wherein the amount that each of the windows is covered exceeds the threshold value if the window is minimized.

8. The wireless communication device of claim 1 wherein the amount that each of the windows is covered exceeds the threshold value if a display screen of the wireless communication device is turned off.

9. A method of operating a wireless communication device, the method comprising:

receiving streaming content from a communication system;

displaying the streaming content in a plurality of windows;

monitoring a screen arrangement of the wireless communication device and determining an amount that each of the windows is covered from view to a user, and if the amount exceeds a threshold value, initiating a packet indicating at least a source packet address and a source port of the streaming content being displayed in the covered window; and transferring the packet to the communication system, wherein the communication system receives the packet, and in response, ceases transmission of the streaming content being displayed in the covered window to the wireless communication device based on at least the source packet address and the source port of the streaming content being displayed in the covered window.

10. The method of claim 9 wherein the source packet address comprises an Internet Protocol address of a content provider of the streaming content being displayed in the covered window.

11. The method of claim 9 wherein the threshold value is fifty percent.

12. The method of claim 9 wherein the amount that each of the windows is covered is the amount that each of the windows is not visible to a user of the wireless communication device.

13. The method of claim 9 further comprising assigning a priority to each of the windows, and wherein the threshold value for each of the windows is based on the priority assigned to each of the windows.

14. The method of claim 9 wherein the threshold value is set by a user of the wireless communication device.

15. The method of claim 9 wherein the amount that each of the windows is covered exceeds the threshold value if the window is minimized.

16. A wireless communication device comprising:

a wireless communication interface configured to receive streaming content from a communication system;

a user interface configured to display the streaming content in a plurality of windows;

a processing system configured to monitor a screen arrangement of the wireless communication device and determine an amount that each of the windows is covered, and if the amount exceeds a threshold value, to initiate a packet indicating a source packet address and a source port of the streaming content being displayed in the covered window; and the wireless communication interface further configured to transfer the packet to the communication system, wherein the communication system receives the packet, and in response, ceases transmission of the streaming content being displayed in the covered window to the wireless communication device based on the source packet address and the source port of the streaming content being displayed in the covered window.

* * * * *